United States Patent [19]
Lottridge et al.

[11] 3,780,834
[45] Dec. 25, 1973

[54] DISC BRAKE ASSEMBLY

[75] Inventors: Neil M. Lottridge; Marc F. Momsen, both of Saginaw, Mich.

[73] Assignee: General Motors Corporation, Detroit, Mich.

[22] Filed: Jan. 15, 1973

[21] Appl. No.: 323,951

[52] U.S. Cl. ............... 188/18 A, 180/75, 188/71.1, 188/73.6, 301/9 DN
[51] Int. Cl. ............................................. B60t 1/06
[58] Field of Search ............... 188/18 A, 71.1, 73.6; 301/9 DN; 180/75

[56] References Cited
UNITED STATES PATENTS
1,618,887   2/1927   Putnam ........................... 301/9 DN
3,637,053   1/1972   Boyles ............................. 188/71.1

Primary Examiner—George E. A. Halvosa
Attorney—W. S. Pettigrew et al.

[57] ABSTRACT

A disc brake assembly, particularly adapted for rear brakes, in which the caliper is fixed to the axle housing and a slidable disc is mounted on a live axle extension section so that the disc is easily removable for brake service.

3 Claims, 2 Drawing Figures

PATENTED DEC 25 1973 3,780,834

DISC BRAKE ASSEMBLY

The invention relates to a fixed caliper sliding disc brake assembly and more particularly to one adapted for use as a vehicle rear wheel brake. A fixed caliper is secured to the axle housing and a slidable disc is mounted so that it can slide axially on the axle to compensate for disc brake lining wear. The assembly is so arranged that, by removal of a portion of the disc mounting means, the disc may be moved radially and cocked at an angle to the axle axis so that when it is then moved axially and the disc outer periphery will clear the outboard leg of the fixed caliper. The disc mounting means includes an axle extension section which may be either integrally formed with the axle or may be secured thereto in piloting relation. The extension section provides a mounting for the vehicle wheel to be braked. The wheel and disc mounting bolts, and tubular spacers on the mounting bolts, are received through openings in the disc. The disc is slidable and piloted on the tubular spacers. By removing the tubular spacers, there is sufficient radial clearance between the disc and any members still extending therethrough to permit the necessary radial movement and cocking action required to clear the fixed caliper. In some installations, the axle extension section and the tubular spacers are removed so that the necessary clearance is provided between the disc and the mounting bolts. In other installations, the necessary clearance is required between the disc and the axle extension section.

IN THE DRAWING

Figure 1:
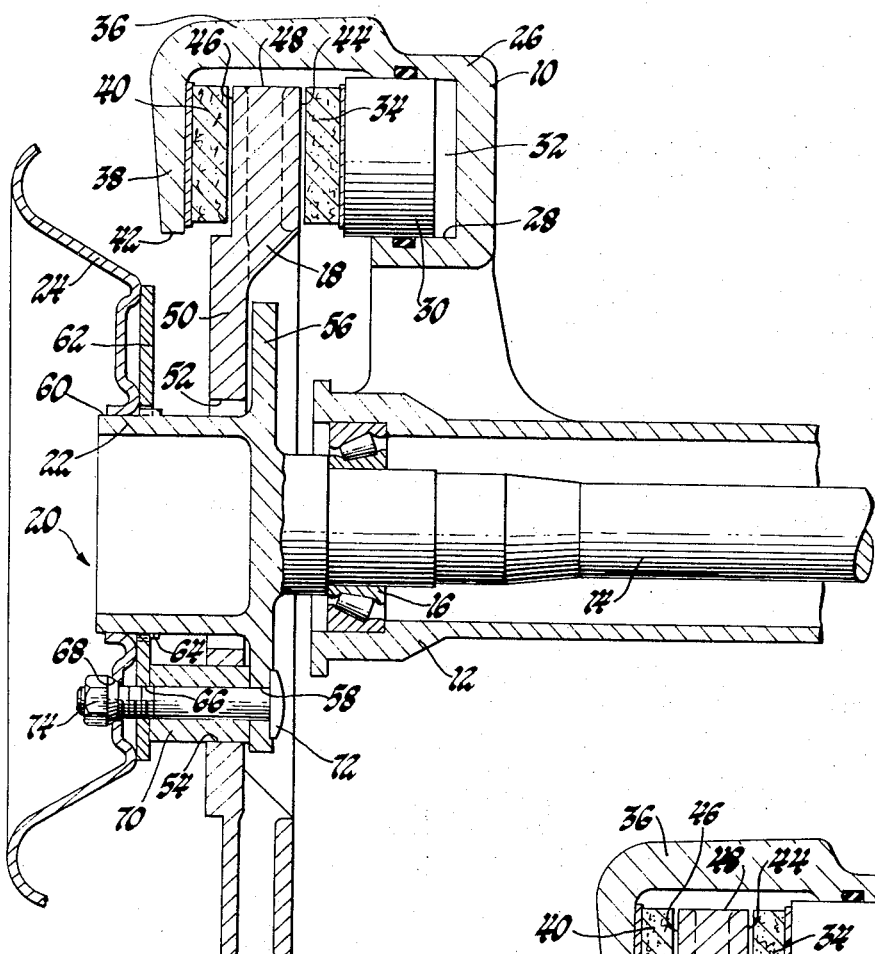
FIG. 1 is a cross-section view, with parts broken away and in section, of a disc brake assembly embodying the invention.

The disc brake assembly of FIG. 1 includes a fixed caliper 10 which is secured to an axle support member 12 so as to transmit braking torque thereto. A rotatable axle 14 is suitably mounted in support member 12 by means of axle bearing 16 so that the axle may be rotated in the support member as the vehicle in which the assembly is installed is moved. A slidable disc 18 is operatively mounted on the axle 14 through mounting means 20. The mounting means includes an axle extension section 22 which also provides a mounting for the wheel 24 to be braked.

The fixed caliper 10 is illustrated as being integrally formed with the axle support member 12. However, it may be separately formed and suitably secured thereto in fixed relation. The caliper includes an inboard leg 26 provided with a cylinder 28 in which piston 30 is reciprocably mounted. The cylinder 28 and piston 30 cooperate to define a pressure chamber 32 which is pressurized by brake fluid when the brake is actuated. A brake pad assembly 34 is suitably mounted on the caliper so as to be moved toward disc 18 when piston 30 is moved outwardly in cylinder 28 due to brake pressure in chamber 32. The brake pad assembly 34 is also arranged to transmit brake torque to the caliper housing. The caliper also includes a bridge section 36 which joins inboard leg 26 with the caliper outboard leg 38. Another brake pad assembly 40 is suitably secured to outboard leg 38 so that it is engageable with disc 18 when the brake is actuated. Outboard leg 38 extends radially inward so that its end 42 terminates immediate radially inward of the brake pad assembly 40.

Disc 18 has opposed friction surfaces 44 and 46 which are respectively engaged by the friction linings of brake pad assemblies 34 and 40 when the brake is actuated. The disc outer periphery 48 terminates radially inward of the caliper bridge section 36. The disc 18 has a mounting section 50 which extends radially inwardly from the friction surface portion of the disc and is illustrated in the embodiment shown as being slightly radially offset. Mounting section 50 has a central aperture 52 provided therein which receives axle extension section 22 therethrough in radially spaced relation. Disc section 50 also has a plurality of mounting bolt-receiving apertures 54, one of which is shown, these apertures being spaced on a bolt circle extending circumferentially around central aperture 52.

In the embodiment shown in FIG. 1, axle extension section 22 is integrally formed as a part of the live axle 14. A radially extending flange 56 is provided on the axle immediately adjacent the axle extension section 22. This flange is provided with bolt-receiving apertures 58 which are axially aligned with the disc apertures 54. Apertures 54 are larger than apertures 58, for reasons described below. The axle extension section 22 has an outer surface 60 adjacent its outer end which provides a pilot for wheel 24. A plate or flange 62 is secured to the axle extension section 22 by suitable means such as splines 64 so that the plate is in driving relation with the axle extension section. Mounting bolt-receiving apertures 66 are provided in plate 62 and similar apertures 68 are provided in wheel 24. These apertures are also axially aligned with apertures 54 and 58. Tubular spacing members 70 are positioned intermediate flange 56 and plate 62 and extend through disc apertures 54 so that the disc is slidably piloted thereon. Mounting bolts 72 extend through apertures 58, 66, and 68, as well as through tubular spacing members 70 and disc apertures 54, and are provided with nuts 74 so that the wheel 24 and the disc 18 are mounted to rotate with axle 14 while allowing disc 18 to slide on the spacing members 70 as necessary to compensate for wear of the friction linings of brake pad assemblies 34 and 40.

When it becomes necessary to remove the disc 18 for any reason, the nuts 74 are removed, followed by wheel 24, plate 62, and tubular spacing members 70. Bolts 72 may or may not be removed, depending upon the installation. Aperture 52 provides sufficient radial clearance relative to axle extension section 22 to permit radial movement of the disc 18 in the direction opposite caliper 10 and also to permit cocking movement of the disc so that the disc may be axially removed with its outer periphery 48 clearing the end 42 of the caliper outboard leg 38. If bolts 72 remain in place on flange 56, the apertures 54 provide similar sufficient clearance relative to the bolts 72. Upon removal of the disc, any work requiring its removal may be easily accomplished, and the brake pad assemblies 34 and 40 may be replaced.

Figure 2:
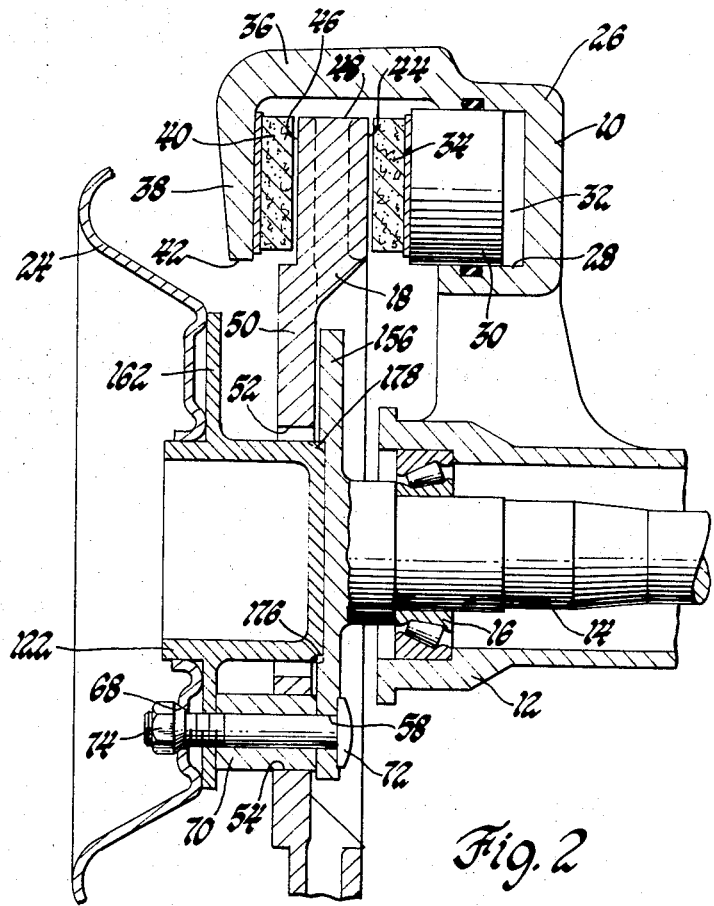
FIG. 2 is a view similar to FIG. 1 and shows a modified disc brake assembly embodying the invention.

The modification shown in FIG. 2 provides a removable axle extension section 122 which has a flange 162 provided thereon in a position similar to that of plate or flange 62 of FIG. 1. The inner end of axle extension section 122 is received in a pilot surface 176 formed on flange 156. The end of axle extension section 122 and pilot surface 176 may be provided with mating splines 178 or some other suitable key arrangement which provides a solid driving connection between axle 14 and the axle extension 122. The remainder of this construction is substantially the same as that shown in FIG. 1, and the same reference characters are therefore utilized.

In order to remove disc 18, nuts 74 are removed, after which the wheel 24, the axle extension section 122, and the tubular spacing members 70 are removed. If bolts 72 are to remain in place in flange 156, the apertures 54 of the disc 18 allow sufficient radial and cocking movements of the disc to permit disc removal. If bolts 72 are removed, the disc may even more easily be removed from the caliper and axle.

What is claimed is:

1. A disc brake assembly comprising:
a fixed caliper;
an annular axially slidable disc having a central aperture and mounting bolt-receiving apertures;
an axle support member having said caliper secured thereto and taking braking torque reaction when the brake is actuated;
a live axle rotatably supported in said axle support member and extending axially outward therefrom and having means thereon mounting a wheel to be braked and said disc in axially slidable and rotatably driven relation,
said mounting means including a flange on said axle, an axle extension section providing a pilot for the wheel, an annular plate in axially spaced relation to said flange and drivingly secured to said axle extension section for rotation therewith, mounting bolts extending through aligned mounting bolt-receiving apertures in said flange and disc and plate and wheel and spaced circumferentially about said axle extension section, and tubular spacing means received through said disc mounting bolt-receiving apertures and on said mounting bolts and positioned axially intermediate said flange and said plate with said disc being slidably supported and piloted thereon; said disc apertures having sufficient radial clearance upon removal of said tubular spacing means to permit sufficient radial displacement and cocking orientation of said disc to axially remove said disc while clearing said caliper.

2. A disc brake assembly comprising:
a fixed caliper;
an annular axially slidable disc having a central aperture and mounting bolt-receiving apertures;
an axle support member having said caliper secured thereto and taking braking torque reaction when the brake is actuated;
a live axle rotatably supported in said axle support member and extending axially outward therefrom and having means thereon mounting a wheel to be braked and said disc in axially slidable and rotatably driven relation,
said mounting means including a flange on said axle, an axle extension section providing a pilot for the wheel, an annular plate in axially spaced relation to said flange and drivingly secured to said axle extension section for rotation therewith, mounting bolts extending through aligned mounting bolt-receiving apertures in said flange and disc and plate and wheel and spaced circumferentially about said axle extension section, and tubular spacing means received through said disc mounting bolt-receiving apertures and on said mounting bolts and positioned axially intermediate said flange and said plate with said disc being slidably supported and piloted thereon;
said disc central aperture having sufficient radial clearance relative to said axle extension section upon removal of said mounting bolts and tubular spacing means to permit sufficient radial displacement and cocking orientation of said disc to axially remove said disc while clearing said caliper.

3. A disc brake assembly comprising:
a fixed caliper;
an annular axially slidable disc having a central aperture and mounting bolt-receiving apertures;
an axle support member having said caliper mounted thereon and taking braking torque reaction when the brake is actuated;
a live axle rotatably supported in said axle support member and extending axially outward therefrom and having means thereon mounting a wheel to be braked and said disc in axially slidable and rotatably driven relation,
said mounting means including a first flange on said axle provided with a pilot surface, an axle extension section having one end piloted in said first flange pilot surface, said axle extension section providing a pilot for the wheel, a second flange on said axle extension section in axially spaced relation to said first flange, mounting bolts extending through aligned mounting bolt-receiving apertures in said flanges and disc and wheel and spaced circumferentially about said axle extension section and securing said wheel to said axle extension section and said axle extension section to said live axle, and tubular spacing means received through said disc mounting bolt-receiving apertures and on said mounting bolts and positioned axially intermediate said first and second flanges with said disc being slidably supported and piloted thereon.

* * * * *